United States Patent [19]

Triani et al.

[11] Patent Number: 4,661,362

[45] Date of Patent: Apr. 28, 1987

[54] DEBITTERING BRAN FLAKES USING CITRUS PEEL

[75] Inventors: Ronald J. Triani, Kalamazoo; Frank J. Meczkowski, Battle Creek, both of Mich.

[73] Assignee: General Foods Corporation, White Plains, N.Y.

[21] Appl. No.: 812,227

[22] Filed: Dec. 23, 1985

[51] Int. Cl.⁴ .................................................. A23L 1/36
[52] U.S. Cl. ..................................... 426/289; 426/93; 426/291; 426/293; 426/486
[58] Field of Search .................... 426/302, 308, 93, 96, 426/102, 103, 486, 804, 289, 291, 293

[56] References Cited

U.S. PATENT DOCUMENTS 1,382,963  6/1921  Ellis ....................................... 426/93
3,826,855  7/1974  Fiorella ............................... 426/308

Primary Examiner—George Yeung
Attorney, Agent, or Firm—Sam D. Walker; Thomas R. Savoie; Daniel J. Donovan

[57] ABSTRACT

A process for eliminating the harsh bitter flavor associated with bran cereal by contacting the bran cereal with dried citrus peel.

6 Claims, No Drawings

DEBITTERING BRAN FLAKES USING CITRUS PEEL

TECHNICAL FIELD

The present invention discloses a process for eliminating the harsh bitter flavor notes associated with bran flakes. More particularly the present invention is concerned with the addition of dry citrus peel to bran flakes to eliminate the harsh bitter bran notes without the addition of high levels of sucrose and sweeteners.

BACKGROUND

Bran is a low cost food grade material which has found its greatest utility as a cereal fiber source. Recently this has developed increased interest among nutritionists and among consumers in high-fiber food products, particularly in high-fiber ready-to-eat cereals. At the present, grain bran is the principal fiber fortifying ingredient which is relied upon to provide high-fiber content. In fiber-fortified food products, the presence of bran is highly desirous, since it is an excellent source of natural fibers. Recent medical research indicates a diet rich in fiber is desirable and advantageous for the maintenance and a satisfactory functioning of the intestines. It is an important aid to regularity and may be helpful in absorbing bile acids.

The conventional breakfast cereal processing technology generally uses bran as a source of fiber. The use of bran, however, has been limited because of its bitter flavor. The bitter flavor in bran is due to protein hydrolization during cooking and toasting. Some of the short chain peptides formed are bitter as are some of the reaction products from Moillard browning.

To overcome the bitter flavor associated with bran fiber, sugars and other sweetening compositions are coated onto the surface of bran cereal or incorporated into the matrix thereof. Attempts to make bran more palatable is disclosed in U.S. Pat. No. 1,382,963 by Ellis, wherein he teaches the incorporation of sugary material with bran resulting in a product that is more flavorful and palatable. The sugary material used is preferably fruits containing considerable amounts of sugar such as figs, dates, prunes raisins and the like. There have also been instances wherein non-farinacious materials were added to cereals. For instance, U.S Pat. No. 2,020,257 by Dickinson discloses the addition of apples, peaches, oranges, tomatoes and the like in a powdered form to the surface of a cereal product such as bran flakes.

The following references disclose the addition of sweetening materials such as sugars or fruit powders or combination thereof to the surface of cereal products.

U.S. Pat. No. 2,707,153 by Bettman discloses the addition of fruit particles or the liquor of the fruit either as a coating or incorporated into the cereal matrix;

U.S. Pat. No. 3,544,332 by Leebins discloses the introduction of a powdered fruit into the voids of an expanded cereal product;

U.S. Pat. No. 1,568,162 by Humphrey discloses the introduction of a natural fruit such as apple into the cereal matrix;

U.S. Pat. No. 4,089,984 by Gilbertson discloses a breakfast cereal coated with a liquid sweetener and/or a fruit flavoring;

U.S. Pat. No. 4,479,9220 discloses a process for enhancing the flavor impact and mouthfeel characteristics of citrus flavor beverages and desserts by adding an effective amount of a bittering agent selected from a group consisting of naringin, limonin, nomilin and combinations thereof.

The above references teach the addition of high levels of sucrose and other sweeteners either from a natural fruit source such as a powdered or a liquid fruit or from the addition of sugars such as fructose and glucose to mask the off-flavor associated with bran products. None of the above references, however, address the elimination of the bitter flavor associated with cereal such as bran flakes witout the addition of high levels of sweetening composition.

It is, therefore, an object of the present invention to make a more palatable bran flake.

Another object of the present invention is to eliminate the harsh bitter flavor notes associated with bran cereals without the addition of high levels of sucrose or sweeteners.

The remaining and other objectives of the present invention will become more apparent from the following description of the invention.

SUMMARY OF THE INVENTION

The present invention is concerned with a process for eliminating the harsh bitter flavor associated with bran cereal comprising contacting bran cereal with sufficient amounts of dried citrus peel to reduce the bitter flavor.

DETAILED DESCRIPTION

In accordance with the present invention, the harsh, bitter-flavor notes associated with bran cereal are eliminated by contacting bran cereal with dry citrus peel. This is accomplished by first coating the bran cereal with a tackifying agent, then tacking powdered citrus peel on to the bran cereal.

In the present invention, a tackifying solution is prepared by combining water with sweeteners in amounts sufficient to produce a sweetening syrup having soluble solids of about 50% (50 Brix). Adjusting the brix may be accomplished by evaporating moisture or adding water. The tackifying solution is then applied to the cereal pieces in any conventional manner, such as, using an enrober drum in order to ensure uniformity in distribution of the sweetening composition.

The tackifying solution is coated onto the cereal in amounts ranging from about 2.0 to about 8.0% by weight of the cereal. The preferred amounts of liquid sweetener should range from about 4.0 to about 6.0% by weight of the cereal. The tackifying solution may be any sweet flavored mono or disaccharide such as, sucrose, fructose, dextrose, maltose corn syrup and the like. The liquid sweetener may also include synthetic sweetener such as aspartame, saccharine and the like. The liquid sweetener, of course, may contain water. Also, the liquid sweetener should have soluble solids ranging from 50 to 80% and water ranging from 50 to 20%.

Prior to applying to the cereal, the liquid sweetener may be heated to an elevated temperature. This makes the liquid sweetener more flowable and thus easier to apply to the cereal. The liquid sweetener may be applied at a temperature ranging from 50° F. to 175° F., and preferably from 70° F. to 80° F.

A dry powdered composition made up substantially of dried citrus peel was then applied to the coated cereal. The liquid sweetener captures the dry material on to the surface of the cereal. The powdered composition should generally range between about 0.1 to 2.0% by weight, and preferbly between about 0.5 and 1.0% by weight.

Citrus peel contains albido and flavedo particles. The albido particles are non-caloric, unflavored, while the flavedo particles contain the bittering agents generally associated with citrus peel. The beneficial results obtained by the addition of ground citrus peel are unexpected and surprising when reviewed against the teachings of the art. The citrus industry has identified the bitter characteristic of citrus peel to be an undesirable flavor property and have attempted to develop processes to remove it. Further, bran fiber has been known to have a bitter flavor associated with its use. This has resulted in several attempts in improving the flavor of bran cereal. The addition of sugar coatings to bran cereal in an attempt to overcome the bitter flavor has been a common practice in the art.

The addition of dried citrus peel to bran flakes achieves the beneficial result of an improved flavor characteristic, a surprising finding in view of the teachings of the art. The addition of a bitter agent to a cereal to overcome the bitter flavor associated with the cereal or to eliminate the bitter attributes associated with bran cereal is truly unexpected and surprising.

The dried citrus peel should be sized so that 100% passes through a USS #20 screen. The preferred citrus peel is a dried orange peel with low levels of albido.

An alternate embodiment of the present invention is the incorporation of dried citrus peel in the matrix of the bran cereal. For instance, when an equivalent amount of dried citrus peel is incorporated with the other dry cereal ingredients and the combination processed according to conventional cereal processing, the resulting cereal exhibited the same flavor characteristics as the bran cereal with topically applied orange peel.

The following examples are provided as illustration of the addition of dried citrus peel to bran cereal to eliminate the bitter flavor associated there with and is not intended to limit the invention disclosed herein.

EXAMPLE I

A sweetening composition was prepared by mixing 50.8 grams of water with 149.2 grams of liquid sucrose (67.5 Brix). The resulting solution had a brix of 50. Two hundred grams of bran cereal were placed in a coating reel and 22.3 grams of the above coating solution was sprayed on at an ambient temperature while mixing to ensure a uniform distribution of the coating.

Dried orange peel was sized so that 100% passed through a USS #20 screen. To the coating reel containing the sugar coated bran cereal, 1.8 grams of the dried orange peel was added to the surface of the cereal while mixing in the coating reel to ensure uniformity of distribution.

The coated cereal was then dried and packaged. The finished product had an acceptable non-bitter flavor uncharacteristic of bran cereal.

EXAMPLE II

A dry blend containing 39.25% wheat flour, 29.0% wheat bran, 31.0% flavoring and 0.75% orange peel were cooked for 50 minutes at 250° F. in a Rotary Cooker to produce grits having a moisture of about 34%. The grits were dried at 250° F. to a moisture of 16%.

The grits were then sized by passing through a 3/8" screen and flaked by passing through flaking rolls. The flaked cereal had a thickness of about 0.025 inches. The flaked cereal was then toasted at 300° F. for 70 seconds to a moisture of 3.0%.

The finished product had a non-bitter cereal flavor uncharacteristic of bran flakes.

What is claimed is:

1. A process for eliminating the harsh bitter flavor associated with bran cereal comprising combining bran cereal with dried citrus peel in amounts sufficient to reduce the harsh bitter flavor.

2. A process according to claim 1 wherein the bran cereal is combined with dry citrus peel by coating said dried citrus peel onto the surface of bran cereal coated with a tackifying composition.

3. A process according to claim 1 wherein the bran cereal is combined with dried citrus peel by incorporating said dried citrus peel into the cereal matrix.

4. A process according to claim 1 wherein the amount of dried citrus peel combined with the bran cereal ranges from 0.1 to 2.0% by weight of the cereal.

5. A process according to claim 1 wherein the dried citrus peel is dried orange peel.

6. A process according to claim 2 wherein the tackifying composition is selected from the group consisting of sucrose, fructose, dextrose, maltose, corn syrup and combinations thereof.

* * * * *